(12) United States Patent
Lobato

(10) Patent No.: US 6,336,287 B1
(45) Date of Patent: Jan. 8, 2002

(54) FISHING HOOK SETTING APPARATUS

(76) Inventor: Herman Lobato, 1029 Walnut St., Windsor, CO (US) 80550

( * ) Notice: Subject to any disclaimer, the term of this patent is extended or adjusted under 35 U.S.C. 154(b) by 0 days.

(21) Appl. No.: 09/544,433

(22) Filed: Apr. 7, 2000

(51) Int. Cl.[7] ............................................. A01K 97/12
(52) U.S. Cl. .................................................. 43/16; 43/15
(58) Field of Search ....................................... 43/15, 16

(56) References Cited

U.S. PATENT DOCUMENTS

| | | | |
|---|---|---|---|
| 2,564,840 A | | 8/1951 | Glenn |
| 2,713,741 A | | 7/1955 | Gnagy |
| 2,744,351 A | * | 5/1956 | Smith .............................. 43/16 |
| 2,804,277 A | * | 8/1957 | Kinder ........................... 43/16 |
| 2,996,824 A | * | 8/1961 | Faycosh ......................... 43/16 |
| D211,636 S | | 7/1968 | Ardizzone |
| 3,914,894 A | * | 10/1975 | Kobza ............................. 43/15 |
| 3,977,117 A | * | 8/1976 | Zahner ........................... 43/15 |
| 4,217,719 A | * | 8/1980 | McDonnell ..................... 43/15 |
| 4,231,178 A | * | 11/1980 | Black .............................. 43/16 |
| 4,391,059 A | * | 7/1983 | Cordova ......................... 43/15 |
| 4,471,553 A | * | 9/1984 | Copeland ....................... 43/15 |
| 4,476,645 A | * | 10/1984 | Paarmann ...................... 43/15 |
| 4,730,408 A | * | 3/1988 | Miller ............................. 43/15 |
| 5,245,778 A | | 9/1993 | Gallegos |
| 5,359,802 A | * | 11/1994 | Gutierrez ....................... 43/16 |
| 5,533,294 A | | 7/1996 | Coulter |
| 5,903,998 A | * | 5/1999 | Hawkins ........................ 43/15 |

* cited by examiner

*Primary Examiner*—Kurt Rowan

(57) ABSTRACT

A fishing hook setting apparatus for preventing a fish from getting away before the angler can set the hook. The fishing hook setting apparatus includes a base having an upright elongate member, a ground-penetrating member attached to the elongate member, and a brace attached to the elongate member, and further includes a support member, a spring-loaded sleeve pivotally mounted upon the support member, a trigger means including a trigger, and a spring-loaded detent, and also includes an alarm means which includes a speaker, a power source, and an on/off switch to audibly notify the user concerning the setting of the hook in a fish.

16 Claims, 2 Drawing Sheets

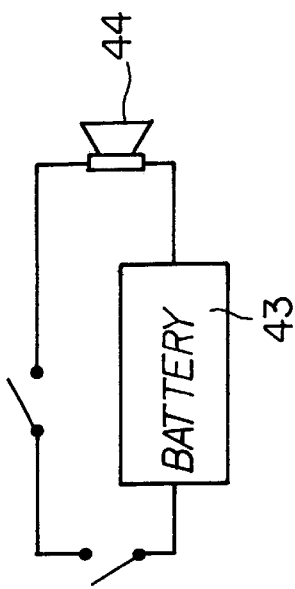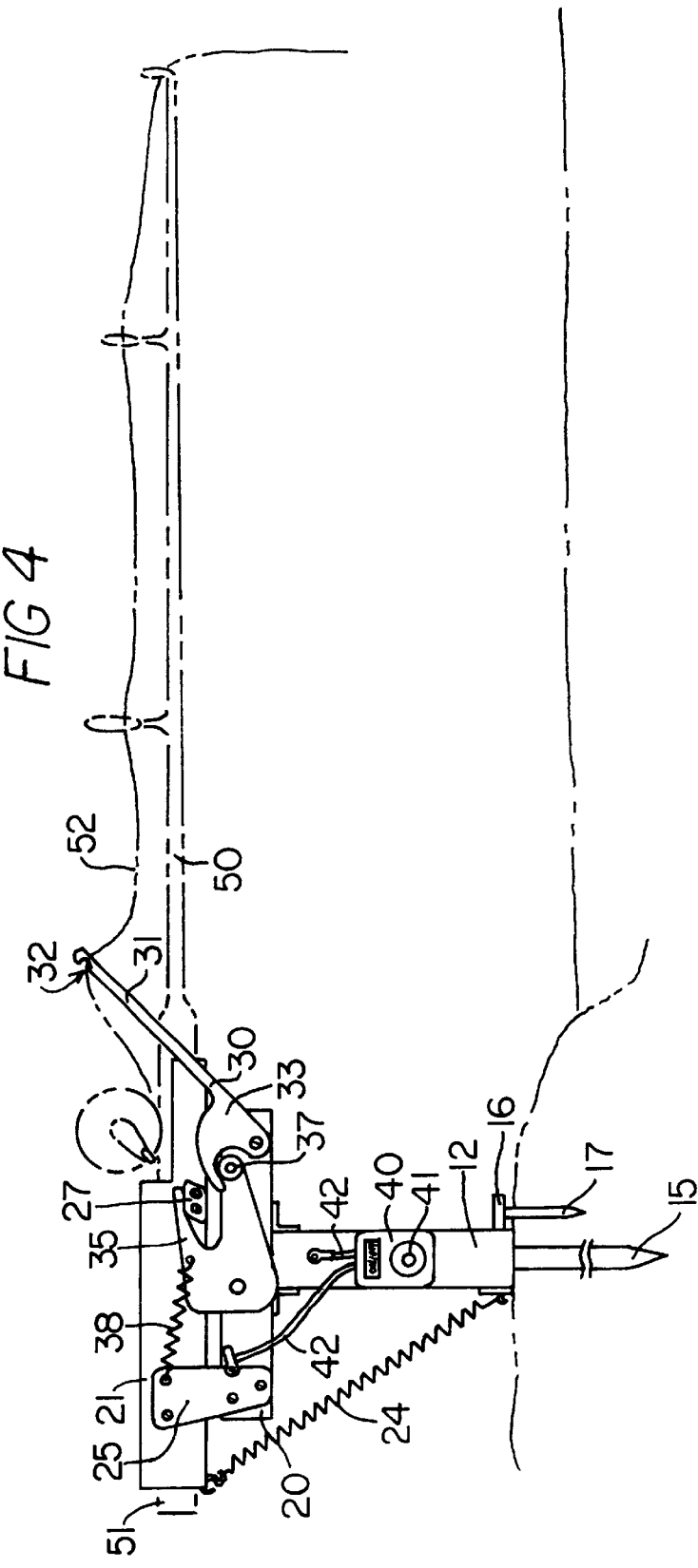

FISHING HOOK SETTING APPARATUS

BACKGROUND OF THE INVENTION

1. Field of the Invention

The present invention relates to a means for setting a hook in a fish and more particularly pertains to a new fishing hook setting apparatus for preventing a fish from getting away before the angler can set the hook.

2. Description of the Prior Art

The use of a means for setting a hook in a fish is known in the prior art. More specifically, a means for setting a hook in a fish heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,564,840; U.S. Pat. No. 2,713,741; U.S. Pat. No. 4,231,178; U.S. Pat. No. 5,533,294; U.S. Pat. No. 5,245,778; and U.S. Pat. No. Des. 211,636.

While these devices fulfill their respective, particular objectives and requirements, the aforementioned patents do not disclose a new fishing hook setting apparatus. The inventive device includes a base having an upright elongate member, a ground-penetrating member attached to the elongate member, and a brace attached to the elongate member, and further includes a support member, a spring-loaded sleeve pivotally mounted upon the support member, a trigger means including a trigger, and a spring-loaded detent, and also includes an alarm means which includes a speaker, a power source, and an on/off switch to audibly notify the user concerning the setting of the hook in a fish.

In these respects, the fishing hook setting apparatus according to the present invention substantially departs from the conventional concepts and designs of the prior art, and in so doing provides an apparatus primarily developed for the purpose of preventing a fish from getting away before the angler can set the hook.

SUMMARY OF THE INVENTION

In view of the foregoing disadvantages inherent in the known types of a means for setting a hook in a fish now present in the prior art, the present invention provides a new fishing hook setting apparatus construction wherein the same can be utilized for preventing a fish from getting away before the angler can set the hook.

The general purpose of the present invention, which will be described subsequently in greater detail, is to provide a new fishing hook setting apparatus which has many of the advantages of the means for setting a hook in a fish mentioned heretofore and many novel features that result in a new fishing hook setting apparatus which is not anticipated, rendered obvious, suggested, or even implied by any of the prior art a means for setting a hook in a fish, either alone or in any combination thereof.

To attain this, the present invention generally comprises a base having an upright elongate member, a ground-penetrating member attached to the elongate member, and a brace attached to the elongate member, and further includes a support member, a spring-loaded sleeve pivotally mounted upon the support member, a trigger means including a trigger, and a spring-loaded detent, and also includes an alarm means which includes a speaker, a power source, and an on/off switch to audibly notify the user concerning the setting of the hook in a fish.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing hook setting apparatus which has many of the advantages of the means for setting a hook in a fish mentioned heretofore and many novel features that result in a new fishing hook setting apparatus which is not anticipated, rendered obvious, suggested, or even implied by any of the prior art a means for setting a hook in a fish, either alone or in any combination thereof.

It is another object of the present invention to provide a new fishing hook setting apparatus which may be easily and efficiently manufactured and marketed.

It is a further object of the present invention to provide a new fishing hook setting apparatus which is of a durable and reliable construction.

An even further object of the present invention is to provide a new fishing hook setting apparatus which is susceptible of a low cost of manufacture with regard to both materials and labor, and which accordingly is then susceptible of low prices of sale to the consuming public, thereby making such fishing hook setting apparatus economically available to the buying public.

Still yet another object of the present invention is to provide a new fishing hook setting apparatus which provides in the apparatuses and methods of the prior art some of the advantages thereof, while simultaneously overcoming some of the disadvantages normally associated therewith.

Still another object of the present invention is to provide a new fishing hook setting apparatus for preventing a fish from getting away before the angler can set the hook.

Yet another object of the present invention is to provide a new fishing hook setting apparatus which includes a base having an upright elongate member, a ground-penetrating member attached to the elongate member, and a brace attached to the elongate member, and further includes a support member, a spring-loaded sleeve pivotally mounted upon the support member, a trigger means including a trigger, and a spring-loaded detent, and also includes an alarm means which includes a speaker, a power source, and an on/off switch to audibly notify the user concerning the setting of the hook in a fish.

Still yet another object of the present invention is to provide a new fishing hook setting apparatus that automatically sets the fishing hook in a fish which strikes the hook.

Even still another object of the present invention is to provide a new fishing hook setting apparatus that provides an audible alarm that alerts the user that a fish is on the line.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic view of the alarm means of the present invention.

FIG. 4 is a side elevational view of the present invention as it is being used.

DESCRIPTION OF THE PREFERRED EMBODIMENT

Figure 1:
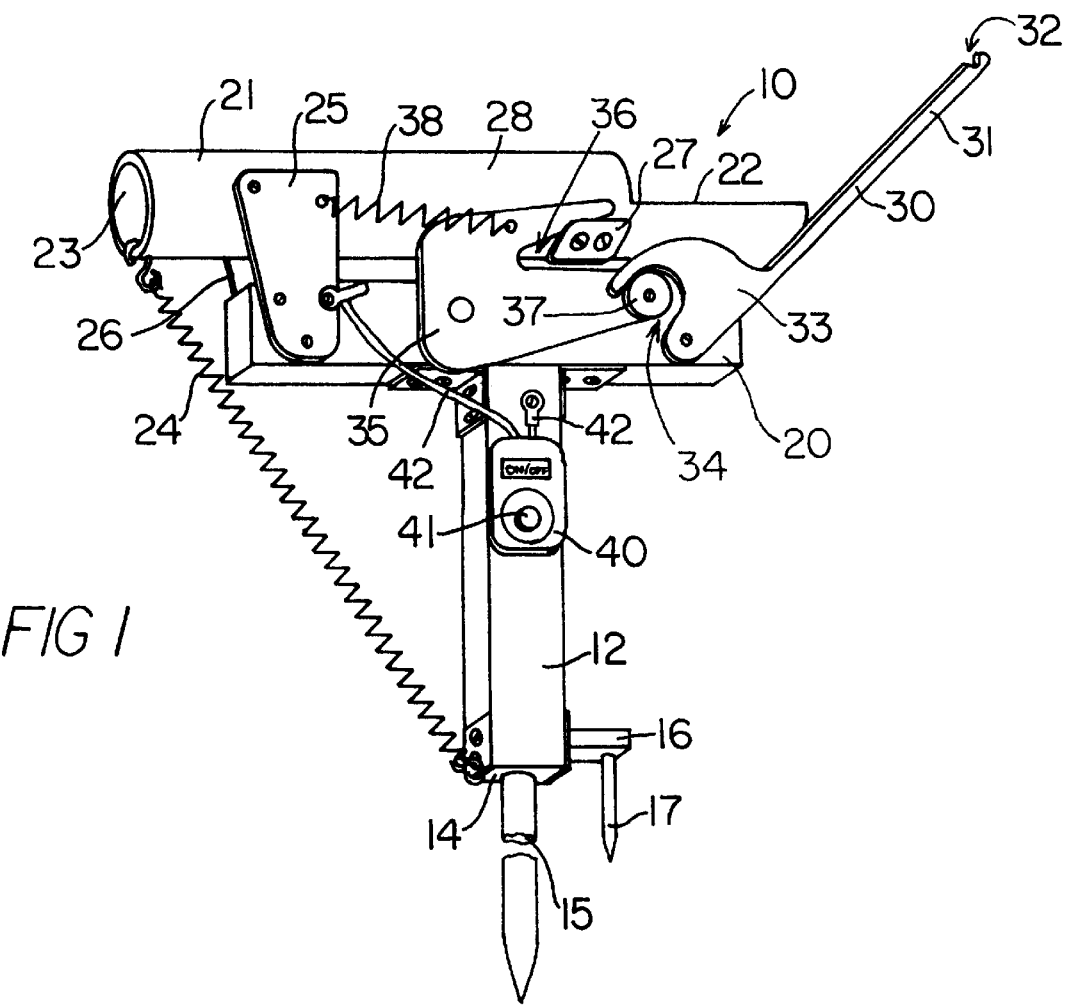
FIG. 1 is a perspective view of a new fishing hook setting apparatus according to the present invention.
Figure 2:
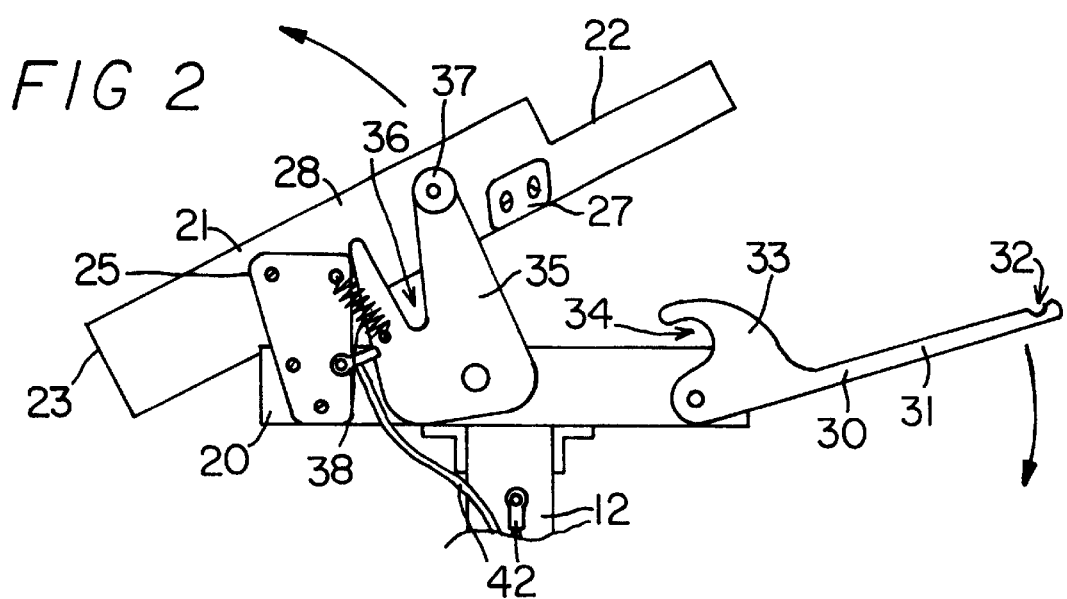
FIG. 2 is a detailed side elevational view of the present invention.

With reference now to the drawings, and in particular to FIGS. 1 through 4 thereof, a new fishing hook setting apparatus embodying the principles and concepts of the present invention and generally designated by the reference numeral 10 will be described.

As best illustrated in FIGS. 1 through 4, the fishing hook setting apparatus 10 generally comprises a base means 11 comprising an upright elongate member 12 having a top end 13 and a bottom end 14, and further comprising a ground penetrating member 15 securely attached or welded to and extending from the bottom end 14, and also comprising a brace means adapted to support the upright elongate member 12. The base means includes a ground-penetrating brace 17 and a brace support member 16 which is securely and conventionally attached to and extending outwardly from the upright elongate member 12 near the bottom end 14 thereof. The ground-penetrating brace 17 is securely and conventionally attached to the brace support member 16 and is spaced from the upright elongate member 12. A support member 20 is securely attached with fasteners to a top end 13 of the upright elongate member 12. A fishing rod holding means includes two mounting brackets 25,26 which are pivotally mounted with fasteners to the support member 20.

A spring-loaded sleeve 21 is securely mounted with fasteners to the mounting brackets 25,26, and a detent-engaging member 27 is securely attached with fasteners to the spring-loaded sleeve 21. The spring-loaded sleeve 21 is adapted to receive and support a handle portion 51 of a fishing pole 50, and further includes a wall 28, a rear end 23 and a front end 22. The detent-engaging member 27 is securely and conventionally attached to an exterior of the wall 28 near the front end 22 thereof. The spring-loaded sleeve 21 further includes a spring 24 having one end securely and conventionally attached to the rear end 23 and having another end securely and conventionally attached at the bottom end 14 of the upright elongate member 12.

The fishing hook setting apparatus further includes a trigger means including a trigger 30 pivotally attached with fasteners to the support member 20. A spring-loaded detent 35 is also pivotally attached with fasteners to the support member 20 and is releaseably retained by the trigger 30 and releaseably engages the detent-engaging member 27. The trigger 30 includes an elongate portion 31 having a notch 32 at an end thereof, and further includes an enlarged portion 33 integrally attached to the elongate portion 31 and having a slot 34 therein. The notch 32 is adapted to receive a fishing line 52. The enlarged portion 33 is pivotally attached with fasteners to the support member 20. The spring-loaded detent 35 is essentially a plate-like member having a slot 36 extending in an edge thereof, the slot 36 being adapted to releaseably receive the detent-engaging member 27. The spring-loaded detent 35 further includes a spring 38 having an end conventionally attached thereto and has another end securely and conventionally attached to one of the mounting brackets 25, and also includes a trigger-engaging member 37 which is securely and conventionally attached to near an edge of the spring-loaded detent 35 and which is adapted to be releaseably received in the slot 34 of the trigger 30. The detent-engaging member 27 is essentially a lug, and the trigger-engaging member 37 is essentially a bearing roller. The mounting brackets 25,26 are securely attached with fasteners near the rear end 23 of the spring-loaded sleeve 21 with the spring-loaded sleeve 21 being disposed generally horizontally when the spring-loaded detent 35 is engaging the detent-engaging member 27. The front end 22 of the spring-loaded sleeve 21 is upwardly movable when the spring-loaded detent 35 disengages from the detent-engaging member 27. An audible alarm means 40 is securely and conventionally mounted to the base means 11 and is connected to a power source 43 such as a battery for signaling setting of a fishing hook in a fish. The audible alarm means 40 further includes an on/off switch 41 and a speaker 44, and is further connected with wires 42 to one of the mounting brackets 25.

In use, the user extends the handle portion 51 of the fishing pole 50 into the spring-loaded sleeve 21 and extends the fishing line 52 through the notch 32 in the trigger 30 and sets the trigger 30 and the spring-loaded detent 35 with the spring-loaded sleeve 21 being disposed generally horizontally. When a fish hits the hook, the fishing line 52 will move thus pulling the trigger 30 downwardly thus releasing the spring-loaded detent 35 which disengages from the detent-engaging member 27 which allows the front end 22 of the spring-loaded sleeve 21 to spring upwardly thus pulling and setting the hook in the mouth of the fish. Additionally, with the pivoting of one of the bracket members 25 and the spring-loaded detent 35, the alarm means 40 is conventionally triggered thus emitting an audible signal to the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing hook setting apparatus comprising:
    a base means comprising an upright elongate member having a top end and a bottom end, and further comprising a ground penetrating member securely attached to and extending from said bottom end, and also comprising a brace means adapted to support said upright elongate member;
    a support member securely attached to a top end of said upright elongate member;
    a fishing rod holding means including at least one mounting bracket which is pivotally mounted to said support member, a spring-loaded sleeve which is securely mounted to said mounting bracket, and further including a detent-engaging member securely attached to said spring-loaded sleeve;
    a trigger means including a trigger pivotally attached to said support member, a spring-loaded detent also pivotally attached to said support member and being releaseably retained by said trigger and releaseably engaging said detent-engaging member;
    an audible alarm means securely mounted to said base means and being connected to a power source for signaling setting of a fishing hook in a fish;
    wherein said spring-loaded sleeve is adapted to receive and support a handle portion of a fishing rod, and further includes a wall, a rear end and a front end, said detent-engaging member being securely attached to an exterior of said wall near said front end thereof;
    wherein said spring-loaded sleeve further includes a spring having one end securely attached to said rear end and having another end securely attached at said bottom end of said upright elongate member;
    wherein said mounting bracket is securely attached near said rear end of said spring-loaded sleeve;
    wherein said spring-loaded sleeve is disposed generally horizontally when said spring-loaded detent is engaging said detent-engaging member, said front end being upwardly movable when said spring-loaded detent disengages from said detent-engaging member;
    wherein said trigger includes an elongate portion having a notch at an end thereof, and further includes an enlarged portion integrally attached to said elongate portion and having a slot therein, said notch being adapted to receive a fishing line;
    wherein said enlarged portion is pivotally attached to said support member; and
    wherein said spring-loaded detent is essentially a plate member having a slot extending in an edge thereof, said slot being adapted to releaseably receive said detent-engaging member, said spring-loaded detent further including a spring having an end attached thereto and having another end securely attached to said at least one mounting bracket, and also including a trigger-engaging member which is securely attached to near an edge of said spring-loaded detent and which is adapted to be releaseably received in said slot of said trigger.

2. A fishing hook setting apparatus as described in claim 1, wherein said base means includes a ground-penetrating brace and a brace support member which is securely attached to and extending outwardly from said upright elongate member near said bottom end thereof, said ground-penetrating brace being securely attached to said brace support member and being spaced from said upright elongate member.

3. A fishing hook setting apparatus as described in claim 1, wherein said detent-engaging member is essentially a lug.

4. A fishing hook setting apparatus as described in claim 1, wherein said trigger-engaging member is essentially a bearing.

5. A fishing hook setting apparatus as described in claim 1, wherein said audible alarm means further includes an on/off switch and a speaker, and is further connected with wires to said at least one mounting bracket.

6. A fishing hook setting apparatus comprising:
    a base means comprising an upright elongate member having a top end and a bottom end, and further comprising a ground penetrating member securely attached to and extending from said bottom end, and also comprising a brace means adapted to support said upright elongate member, said base means including a ground-penetrating brace and a brace support member which is securely attached to and extending outwardly from said upright elongate member near said bottom end thereof, said ground-penetrating brace being securely attached to said brace support member and being spaced from said upright elongate member;
    a support member securely attached to a top end of said upright elongate member;
    a fishing rod holding means including at least one mounting bracket which is pivotally mounted to said, support member, a spring-loaded sleeve which is securely mounted to said mounting bracket, and further including a detent-engaging member securely attached to said spring-loaded sleeve, said spring-loaded sleeve being adapted to receive and support a handle portion of a fishing rod, and further including a wall, a rear end and a front end, said detent-engaging member being securely attached to an exterior of said wall near said front end thereof, said spring-loaded sleeve further including a spring having one end securely attached to said rear end and having another end securely attached at said bottom end of said upright elongate member, said mounting bracket being securely attached near said rear end of said spring-loaded sleeve, said spring-loaded sleeve being disposed generally horizontally when said spring-loaded detent is engaging said detent-engaging member, said front end being upwardly movable when said spring-loaded detent disengages from said detent-engaging member;
    a trigger means including a trigger pivotally attached to said support member, a spring-loaded detent also pivotally attached to said support member and being releaseably retained by said trigger and releaseably engaging said detent-engaging member, said trigger including an elongate portion having a notch at an end thereof, and further including an enlarged portion integrally attached to said elongate portion and having a slot therein, said notch being adapted to receive a fishing line, said enlarged portion being pivotally attached to said support member, said spring-loaded detent being essentially a plate-like member having a slot extending in an edge thereof, said slot being adapted to releaseably receive said detent-engaging member, said spring-loaded detent further including a spring having an end attached thereto and having another end securely attached to said at least one mounting bracket, and also including a trigger-engaging member which is securely attached to near an edge of said spring-loaded detent and which is adapted to be releaseably received in said slot of said trigger, said detent-engaging member is essentially a lug, said trigger-engaging member being essentially a bearing; and an audible alarm means securely mounted to said base means and being connected to a power source for signaling setting of a fishing hook in a fish, said audible alarm means further including an on/off switch and a speaker, and being further connected with wires to said at least one mounting bracket.

7. A fishing hook setting apparatus comprising:

a base means comprising an upright elongate member having a top end and a bottom end, and further comprising a ground penetrating member securely attached to and extending from said bottom end, and also comprising a brace means adapted to support said upright elongate member;

a support member securely attached to a top end of said upright elongate member;

a fishing rod holding means including at least one mounting bracket which is pivotally mounted to said support member, a spring-loaded sleeve which is securely mounted to said mounting bracket, and further including a detent-engaging member securely attached to said spring-loaded sleeve;

a trigger means including a trigger pivotally attached to said support member, a spring-loaded detent also pivotally attached to said support member and being releaseably retained by said trigger and releaseably engaging said detent-engaging member;

an audible alarm means securely mounted to said base means and being connected to a power source for signaling setting of a fishing hook in a fish;

wherein said trigger includes an elongate portion having a notch at an end thereof, and further includes an enlarged portion integrally attached to said elongate portion and having a slot therein, said notch being adapted to receive a fishing line; and wherein said spring-loaded detent is essentially a plate member having a slot extending in an edge thereof, said slot being adapted to releaseably receive said detent-engaging member, said spring-loaded detent further including a spring having an end attached thereto and having another end securely attached to said at least one mounting bracket, and also including a trigger-engaging member which is securely attached to near an edge of said spring-loaded detent and which is adapted to be releaseably received in said slot of said trigger.

8. A fishing hook setting apparatus as described in claim 7, wherein said base means includes a ground-penetrating brace and a brace support member which is securely attached to and extending outwardly from said upright elongate member near said bottom end thereof, said ground-penetrating brace being securely attached to said brace support member and being spaced from said upright elongate member.

9. A fishing hook setting apparatus as described in claim 7, wherein said spring-loaded sleeve is adapted to receive and support a handle portion of a fishing rod, and further includes a wall, a rear end and a front end, said detent-engaging member being securely attached to an exterior of said wall near said front end thereof.

10. A fishing hook setting apparatus as described in claim 9, wherein said spring-loaded sleeve further includes a spring having one end securely attached to said rear end and having another end securely attached at said bottom end of said upright elongate member.

11. A fishing hook setting apparatus as described in claim 9, wherein said mounting bracket is securely attached near said rear end of said spring-loaded sleeve.

12. A fishing hook setting apparatus as described in claim 9, wherein said spring-loaded sleeve is disposed generally horizontally when said spring-loaded detent is engaging said detent-engaging member, said front end being upwardly movable when said spring-loaded detent disengages from said detent-engaging member.

13. A fishing hook setting apparatus as described in claim 12, wherein said enlarged portion is pivotally attached to said support member.

14. A fishing hook setting apparatus as described in claim 7, wherein said detent-engaging member is essentially a lug.

15. A fishing hook setting apparatus as described in claim 7, wherein said trigger-engaging member is essentially a bearing.

16. A fishing hook setting apparatus as described in claim 7, wherein said audible alarm means further includes an on/off switch and a speaker, and is further connected with wires to said at least one mounting bracket.

* * * * *